United States Patent Office 3,197,423
Patented July 27, 1965

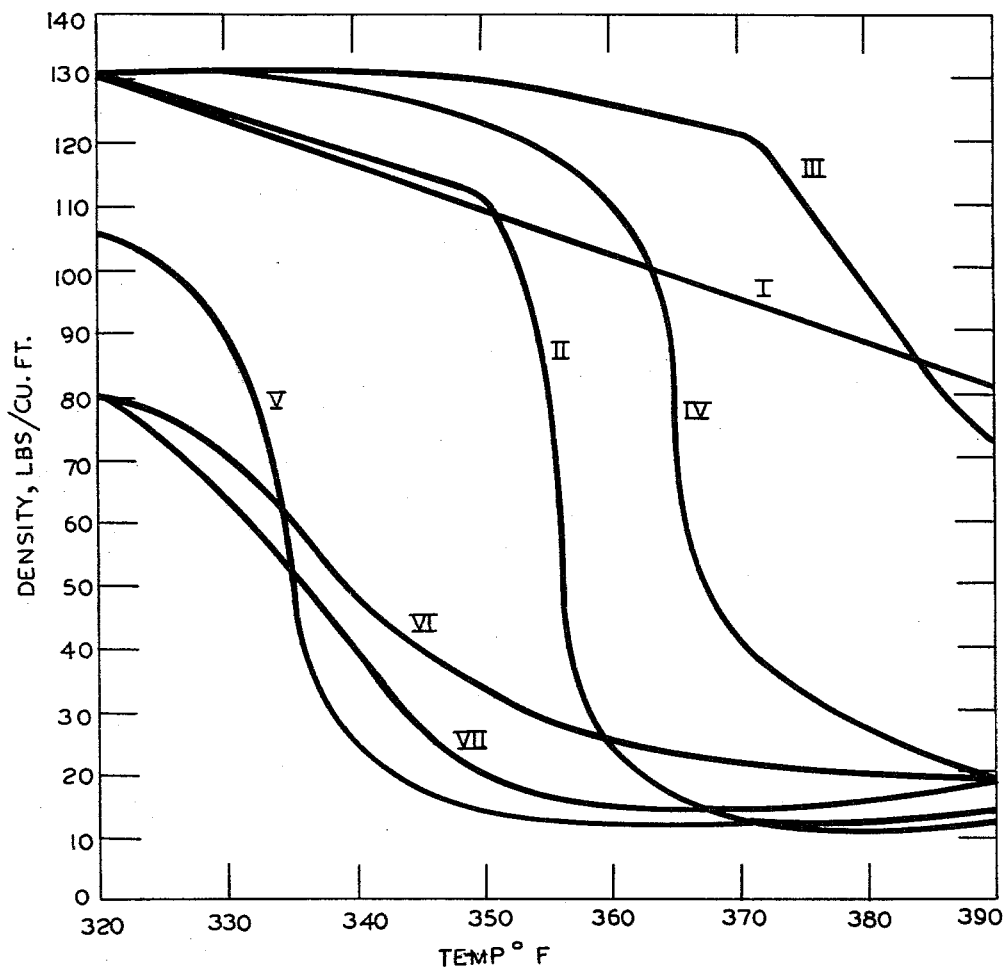
DENSITY OF FOAMS VS. TEMP.

3,197,423
MANUFACTURE OF CELLULAR POLYVINYL
CHLORIDE
Bernard Ackerman, Metuchen, N.J., assignor to Carlisle
Chemical Works, Inc., Reading, Ohio
Filed May 2, 1962, Ser. No. 191,916
5 Claims. (Cl. 260—2.5)

This application is a continuation-in-part of my application Ser. No. 81,707, filed January 10, 1961, for Heat-Resistant Plastic Composition, where I have disclosed the use of potassium-zinc salt combinations here described as stabilizers for conventional non-cellular vinyl chloride polymers.

The invention relates to the manufacture of cellular polyvinyl chloride, for example, as commonly used in connection with the coating of fabrics.

The production of vinyl chloride polymer foam from a plastisol is well known and has been frequently described. A preferred method consists in incorporating a chemical blowing agent which liberates a gas at a time when the vinyl plastic is sufficiently cohesive to retain the gas developed. The general principles for the preparation of vinyl foam have been described recently in the article "Formulating Chemically Blown Plastisol Foam," by Arnold C. Werner, in the October 1961 issue of Modern Plastics, and methods of manufacturing chemically blown calendered polyvinyl chloride sheeting have been disclosed, for instance, in U.S. Patent No. 2,964,799 and in British Patents Nos. 665,162 and 795,348. As this invention is concerned with a rather specific aspect of the vinyl chloride polymer foam preparation, reference is had to those recited publications for a general understanding of the foam forming techniques.

An essential problem in the foam preparation, be it the conventional production from plastisol systems or in the newer techniques of calendered sheet and extruded profiles, is the control of the density and cell size of the foam, which is a function of many variables such as viscosity of the plastisol, concentration, decomposition temperature and rate of decomposition of the blowing agent, and others. Many proposals have been made to control the cell formation, for instance by the addition of viscosity modifiers or by the proper selection of plasticizers or stabilizers.

Blowing agents used in accordance with the invention are those which contain a nitrogen to nitrogen bond such as azo compounds, azides, hydrazides, hydrazones, dinitroso compounds, and others. A list of suitable compounds is given, for instance, in U.S. Patent No. 2,901,446. I prefer to use azodicarbonamide as blowing agent. The amount of blowing agent used may vary within rather wide limits and will be normally within the range of 1–10% by weight of the polyvinyl chloride.

It is customary to add stabilizers to polyvinyl chloride resins in order to prevent or delay discoloration and breakdown of the polymer during processing and in service, and it has been recognized that the proper selection of the stabilizer is one of the factors influencing the decomposition temperature of the blowing agent and its rate of decomposition, thereby determining the density and quality of the obtained foam.

It is a principal object of the invention to provide a stabilizer system which is superior to the systems used heretofore in producing in a very short time and at low temperatures an ultimate low foam density.

Stabilizers which have been used as activators or promotors for the blowing agent are essentially organic salts of lead, barium and cadmium, alone or in combination.

Though zinc also activates the gas development of blowing agents, it cannot be used because it causes a rapid decomposition of polyvinyl chloride upon heating to the temperature necessary for the curing of the plastisol and also for the action of the blowing agent. When alkali earth metal salts are used in combination with zinc salts to prevent such decomposition, it is found that they retard or even nullify to a large extent the catalytic or promotional effect of the zinc on the blowing agent so that only a minor decrease of the decomposition temperature of the blowing agent can be observed.

I have now found that excellent results which are superior to most other stabilizer combinations, are obtained when a potassium-zinc salt combination is used as a stabilizer-blowing agent composition. The amounts of the components in said combination are such that the ratio of Zn:K is from about 10:1 to 10:10, preferably 10:3 to 10:8. The combination is used in such amounts that 0.01 to 3 percent, preferably 0.05 to 1.0 percent of Zn by weight of the resin are employed.

The outstanding synergistic action of the zinc-potassium activator-stabilizer is limited to that particular combination and not shown when the components are replaced by closely related metals, for instance by cadmium or sodium, respectively.

In contrast to other alkali metals and alkaline earth metals, potassium does not affect the activating property of zinc but rather enhances it, and it has the decisive advantage to counteract the harmful decomposing effects of zinc so that in the zinc-potassium combination the useful properties of zinc can be fully exploited while its harmful effects are entirely blocked.

The salts are preferably added in form of their solution in hydrocarbon solvents, alcohols, glycol-ethers or combinations thereof.

The zinc salts employed in the stabilizer combination are derived from organic acids, preferably acids having 8 to 24 carbon atoms. Either unsubstituted aliphatic, aromatic or alicyclic monocarboxylic acids may be used, as well as hydroxy acids, unsaturated acids or mono-esters of dicarboxylic acids. Examples of unsubstituted acids are caprylic, capric, lauric, stearic 2-ethylhexoic, isodecanoic, benzoic, p-tert.-butylbenzoic, and cyclohexanecarboxylic acid. Suitable hydroxy acids are alpha-hydroxy acids such as alpha-hydroxy derivatives of the above recited aliphatic acids, also ricinoleic acid, alpha-hydroxy stearic acid and palmitic acid, and others. Examples of unsaturated acids are oleic and linoleic acids. Typical mono esters are mono butyl maleate and mono decyl phthalate. The salts may be either neutral or basic salts.

Though, in principle, potassium salts of the same acids as recited above, might be used, many of said acids, particularly acids having more than 14 carbon atoms, are not suitable because they form potassium salts which are difficult to obtain in dry form, without moisture, and which cannot be dissolved in solvents at reasonable concentrations without gelation. I am using, therefore, preferably potassium salts of unsubstituted straight or branched aliphatic acids having 8 to 14 carbon atoms, whereby such salts can be used together with zinc salts of the same acids or with a zinc salt of any other of the acids disclosed hereinabove. Potassium and zinc salts of phenols or alkyl phenols, such as butyl phenol or nonyl phenol, may also be used.

When using my novel stabilizer system, the blowing temperature is, for azodicarbonamide, about 350° F., and is readily ascertained for other blowing agents.

In addition to the activator combination of the invention, other heat and particularly light stabilizers may be incorporated in the resins. Suitable additional stabilizers are, for instance, epoxides, organic phosphites and/or alkyl substituted phenols and alkali metal and alkaline earth metal salts thereof. The plastisols may contain the conventional additional ingredients such as plasticizers, fillers, and the like.

The invention is illustrated by the following examples which are by weight unless indicated otherwise.

EXAMPLE 1
*(No activator)*

The following formulation was used in preparing in making cellular vinyl coated fabric.

| | |
|---|---|
| Polyvinyl chloride | 100 |
| Dioctyl phthalate | 60 |
| Butyl benzyl phthalate | 30 |
| Epoxidized soya bean oil | 5 |
| Mixture of equal parts of epoxidized soybean oil and azodicarbonamide | 8 |

This formulation was weighed out and milled on a two roll mill at 290° F. for 3 minutes. It was rolled into a cylindrical shape and then laminated to a piece of filter cloth by passing the vinyl film and filter cloth simultaneously through the rollers of the mill. The laminated strips were then cut into 4″ x 4″ pieces and baked in an oven for 4 minutes at temperatures varying from 320° F. to 390° F. After baking the pieces were cut with a die into a circle having a diameter of 3″. The circles were then weighed and measured and the foam density was calculated. The weight and thickness of the filter cloth backing were subtracted from the total value in order to give the density of the foam.

EXAMPLES 2-7

The same formulations as in Example 1 were used with the exception that various promoters were added as listed in Table I.

TABLE I

| Example | Addition to composition of Example 1 |
|---|---|
| 2 | 1.8 parts of a Zn Octoate solution containing 18% zinc. |
| 3 | 2 parts of a Ba Octoate solution containing 16% barium. |
| 4 | 6.4 parts of a K Octoate solution containing 5% K. |
| 5 | 0.2 part of a K Octoate solution containing 5% K and 0.56 part of a Zn Octoate solution containing 18% Zn. |
| 6 | 2.14 parts of a Ba Octoate solution containing 16% Ba and 1.0 part of a Cd Octoate solution containing 16% cadmium. |
| 7 | 0.83 part of a K Octoate solution containing 4.84% K, 0.72 part of a Zn Octoate solution containing 18.1% Zn and 0.33 part of a Cd Octoate solution containing 19.1% Cd. |

The foam density of the various examples, expressed in lbs./cubic feet, at various baking temperatures (F.) is given in Table II. The results of Table II are also given in the form of graphs in the accompanying drawing.

TABLE II

| Example | 320° | 330° | 340° | 350° | 360° | 370° | 380° | 390° |
|---|---|---|---|---|---|---|---|---|
| 1 | 130.6 | 126.1 | 115.9 | 108.3 | 104.2 | 98.4 | 81.0 | 79.2 |
| 2 | 131.3 | 127.3 | 119.4 | 112.9 | 25.2 | 13.1 | 12.3 | 13 |
| 3 | 132.8 | 132.2 | 131.7 | 131.3 | 126.2 | 121.9 | 96.5 | 72.9 |
| 4 | 131.3 | 130.8 | 130.6 | 124.0 | 110.1 | 40.8 | 29.3 | 21.7 |
| 5 | 105.6 | 91.7 | 25.1 | 14.6 | 14.0 | 13.7 | 13.9 | 14.4 |
| 6 | 79.7 | 71.2 | 49.9 | 34.3 | 26.6 | 22.5 | 19.7 | 19.5 |
| 7 | | 63.3 | 38.7 | 18.2 | 16.9 | 16.7 | 17.3 | 18.6 |
| | | | | | | | | .2 |

Substitution of the salts in the above examples by salts of other acids of the recited groups did not substantially change the result. For instance, in Example 2 the results remained essentially the same when the zinc octoate was replaced by zinc caprylate, zinc p-tert. butyl benzoate, or zinc isodecanoate.

In Example 4, the potassium octoate was replaced by potassium nonylphenate, potassium laurate, and potassium benzoate without producing any substantial changes in the curve 4. Similarly, exchange of any of the octoates used in Example 5 against one of the salts named hereinabove produced similar results.

EXAMPLE 8

A composition identical to that in Example 5 was poured into a shallow cylindrical mold ½ inch deep and 3 inches in diameter. The mold was closed tightly by means of bolts and heated to approximately 300–310° F. At this temperature partial fusion of the plastisol occurred. The mold was cooled and the partially fused disc of about ½ inch deep and 3 inches in diameter was placed in an oven at 350° F. for 15–20 minutes. Fusion was completed and expansion occurred uniformly to give a flexible foam disc of about 1¼ inches deep x 7 inches diameter. This disc could be used as is for a cushion or pillow core.

Though the above examples have been made with a vinyl chloride homopolymer resin, copolymers of vinyl chloride with other unsaturated copolymerizable compounds such as vinylidene chloride or vinyl acetate whereby such copolymer should contain at least 80 percent of vinyl chloride.

I claim:

1. A method for making a cellular material from a vinyl chloride polymer which comprises adding to said polymer a chemical blowing agent containing a nitrogen to nitrogen bond and as activator reducing the decomposition temperature of said blowing agent a salt mixture comprising a zinc salt of a member of the group consisting of organic monocarboxylic acids having 8 to 24 carbon atoms, phenol, and alkyl phenols, and a potassium salt of a member of the group consisting of monocarboxylic acids having 8 to 14 carbon atoms, phenol, and alkyl phenols, and heating said polymer to decompose the blowing agent.

2. The method as claimed in claim 1 wherein said blowing agent is azodicarbonamide.

3. The method as claimed in claim 1 wherein said salt mixture is applied dissolved in an organic solvent selected from the group consisting of hydrocarbons, alcohols, and glycol ethers.

4. A composition suitable for the manufacture of expanded vinyl chloride polymer comprising a vinyl chloride polymer plastisol, a chemical blowing agent containing a nitrogen to nitrogen bond, and as activator reducing the decomposition temperature of said blowing agent a salt mixture comprising a zinc salt of a member of the group consisting of organic monocarboxylic acids having 8 to 24 carbon atoms, phenol, and alkyl phenols, and a potassium salt of a member of the group consisting of organic monocarboxylic acids having 8 to 14 carbon atoms, phenol, and alkyl phenols, zinc being present in an amount of 0.01 to 3 percent by weight of the polymer and the ratio of zinc to potassium being from 10:1 to 10:10.

5. The composition as claimed in claim 4 containing as blowing agent azodicarbonamide in an amount of 1 to 10 percent by weight of said polymer.

References Cited by the Examiner

UNITED STATES PATENTS 2,446,976 8/48 Cousins _____ 260—45.75
2,964,799 12/60 Roggi et al. _____ 260—2.5

MURRAY TILLMAN, *Primary Examiner.*

LEON J. BERCOVITZ, *Examiner.*